(12) United States Patent
Hosoda

(10) Patent No.: US 10,298,888 B2
(45) Date of Patent: May 21, 2019

(54) ADAPTIVE ANALYZER OF SENSITIVITY DIFFERENCE OF SAME COLOR PIXELS AND ADAPTIVE CORRECTOR OF SENSITIVITY DIFFERENCE OF SAME COLOR PIXELS

(71) Applicant: Kabushiki Kaisha Toshiba, Minatu-ku, Tokyo (JP)

(72) Inventor: Sohichiroh Hosoda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 15/041,720

(22) Filed: Feb. 11, 2016

(65) Prior Publication Data

US 2017/0064230 A1    Mar. 2, 2017

Related U.S. Application Data

(60) Provisional application No. 62/209,518, filed on Aug. 25, 2015.

(51) Int. Cl.
*H04N 9/04* (2006.01)
*H04N 5/365* (2011.01)

(52) U.S. Cl.
CPC .......... *H04N 9/045* (2013.01); *H04N 5/3653* (2013.01)

(58) Field of Classification Search
CPC .. H04N 5/23212; H04N 9/07; H04N 5/23293; H04N 5/378; H04N 5/2353; G02B 7/34; G06T 5/007
USPC ............. 348/223.1, 272; 250/208.1; 382/284
See application file for complete search history.

(56) References Cited

U.S. PATENT DOCUMENTS

| 8,111,298 | B2 | 2/2012 | Kameya | |
|---|---|---|---|---|
| 8,804,012 | B2 | 8/2014 | Kaizu et al. | |
| 2002/0163583 | A1* | 11/2002 | Jones | H04N 5/235 348/272 |
| 2012/0086829 | A1* | 4/2012 | Hohjoh | H04N 5/772 348/223.1 |
| 2013/0033616 | A1* | 2/2013 | Kaizu | H04N 5/35554 348/222.1 |
| 2013/0242152 | A1* | 9/2013 | Kasai | H04N 5/2353 348/294 |

FOREIGN PATENT DOCUMENTS

| JP | 2007-243515 A | 9/2007 |
|---|---|---|
| JP | 4714044 A | 4/2011 |

* cited by examiner

*Primary Examiner* — Xi Wang
(74) *Attorney, Agent, or Firm* — White & Case LLP

(57) ABSTRACT

According to an embodiment, an adaptive analyzer of sensitivity difference of same color pixels analyzes a sensitivity difference of same color pixels of an image sensor. The same color pixels are divided into first and second groups. The adaptive analyzer includes an accumulator, a calculator, a correction ratio controller and a memory. The accumulator is configured to cumulatively add pixel values of pixels in the first group and pixel values of pixels in the second group per macro block, respectively, on an image captured in the image sensor. The calculator is configured to calculate a ratio between a cumulatively added value of the pixels in the first group and a cumulatively added value of the pixels in the second group in the macro block. The correction ratio controller is configured to set a correction ratio for the sensitivity difference based on the ratio per macro block.

20 Claims, 11 Drawing Sheets

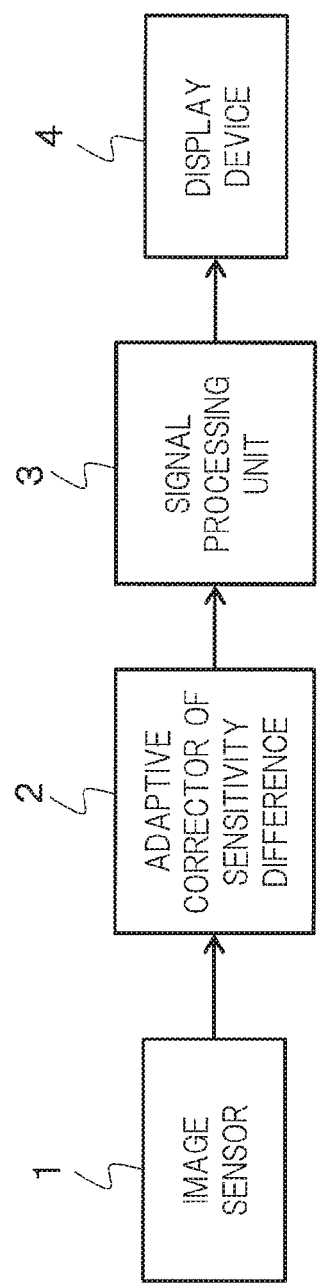
F I G. 1

| RATIO | CORRECTION RATIO[%] |
|---|---|
| 0 | 0.00 |
| 1 | 0.39 |
| 2 | 0.78 |
| 3 | 1.17 |
| 4 | 1.56 |
| 5 | 1.95 |
| 6 | 2.34 |
| 7 | 2.73 |
| 8 | 3.13 |
| 9 | 3.52 |
| 10 | 3.91 |
| 11 | 4.30 |
| 12 | 4.69 |
| 13 | 5.08 |
| 14 | 5.47 |
| 15 | 5.86 |
FIG.5A
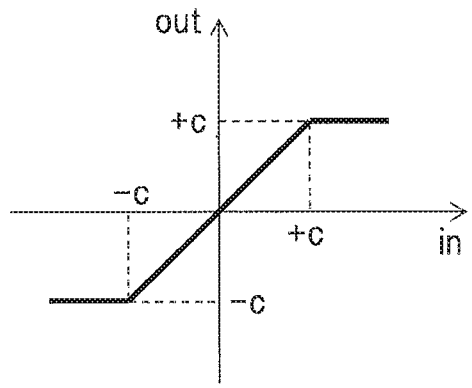
FIG.5B
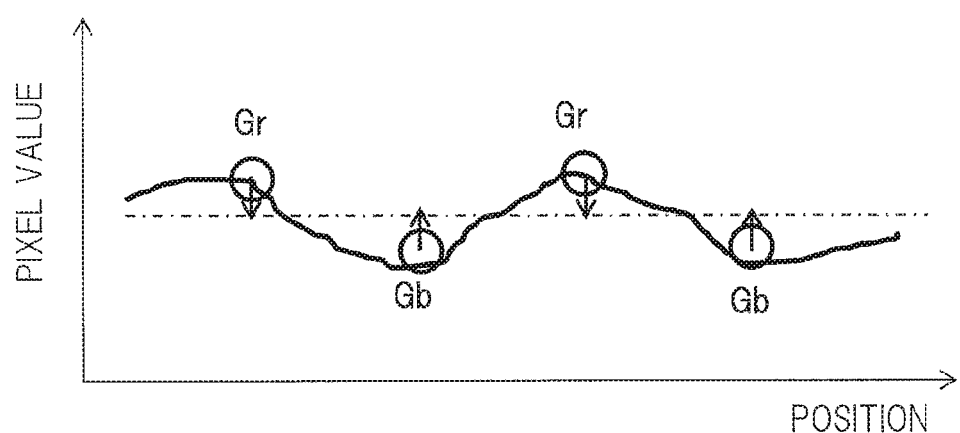
FIG.5C RATIO_Cn =
{ RATIO_Ln
+ RATIO_An
+ RATIO_Mn
+ RATIO_CACC}>>2

ADAPTIVE ANALYZER OF SENSITIVITY DIFFERENCE OF SAME COLOR PIXELS AND ADAPTIVE CORRECTOR OF SENSITIVITY DIFFERENCE OF SAME COLOR PIXELS

CROSS REFERENCE TO RELATED APPLICATIONS

This application is based upon and claims the benefit of priority from the prior U.S. Provisional Patent Application No. 62/209,518, filed on Aug. 25, 2015, the entire contents of which are incorporated herein by reference.

FIELD

Embodiments described herein relate generally to an adaptive analyzer of sensitivity difference of same color pixels and an adaptive corrector of sensitivity difference of same color pixels.

BACKGROUND

Pixels of an image sensor are arranged, e.g., in a Bayer array. In such an image sensor, G pixels (green pixels) include Gr pixels located in rows of R pixels (red pixels) and Gb pixels located in rows of B pixels (blue pixels). The Gr pixels and the Gb pixels are preferably equal in terms of sensitivity. However, a sensitivity difference occurs due to a pixel arrays, non-uniformity of color filter films, differences of readout characteristics in a pixel arrays or the like. Accordingly, the sensitivity difference needs to be corrected.

BRIEF DESCRIPTION OF THE DRAWINGS

FIG. 1 is a block diagram illustrating a configuration of an image processing system according to an embodiment.

FIG. 5A is a diagram illustrating relationship between a correction ratio (RATIO) and a correction ratio [%].

FIG. 5B is a diagram illustrating relationship between a correction value "in" input to a sensitivity difference correction value clip unit and a correction value "out" output from the sensitivity difference correction value clip unit.

FIG. 5C is a diagram describing correction of the pixel values of a Gr pixels and a Gb pixels.

DETAILED DESCRIPTION

Figure 2:
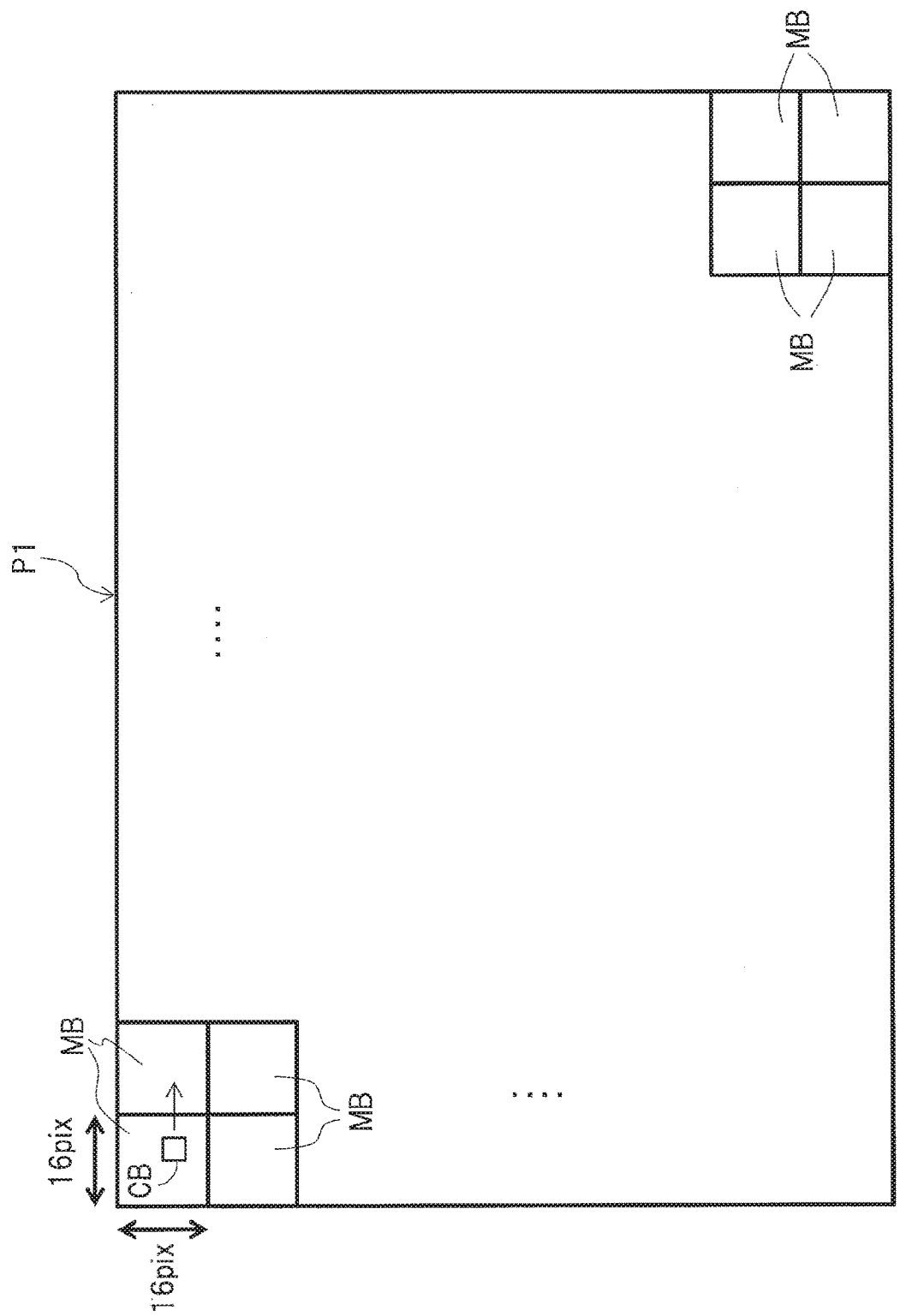
FIG. 2 is a diagram illustrating an image partitioned into a plurality of macro blocks.

According to an embodiment, an adaptive analyzer of sensitivity difference of same color pixels analyzes a sensitivity difference of same color pixels of an image sensor. The same color pixels are divided into first and second groups in accordance with relative positions to different color pixels. The adaptive analyzer of sensitivity difference of same color pixels includes an accumulator, a calculator, a correction ratio controller and a memory. The accumulator is configured to cumulatively add pixel values of pixels in the first group and pixel values of pixels in the second group per macro block, respectively, on an image captured in the image sensor. The calculator is configured to calculate a ratio between a cumulatively added value of the pixels in the first group and a cumulatively added value of the pixels in the second group in the macro block. The correction ratio controller is configured to set a correction ratio for the sensitivity difference based on the ratio per macro block. The memory is configured to store the correction ratio per macro block.

Hereinafter, embodiments of the present invention will be described with reference to the drawings. The embodiments do not limit the present invention.

FIG. 1 is a block diagram illustrating a configuration of an image processing system according to an embodiment. The image processing system includes an image sensor 1, an adaptive corrector of sensitivity difference 2, a signal processing unit 3, and a display device 4.

The image sensor 1 captures a still image or a moving image and outputs image data. The image data includes pixel values of a plurality of pixels provided in the image sensor 1. The plurality of pixels include R pixels, G pixels, and B pixels and are arranged in a Bayer array in a row direction and in a column direction.

The G pixels of the same color are divided into first and second groups in accordance with relative positions to the R pixels and the B pixels. For example, pixels in the first group are Gr pixels located in rows of the R pixels while pixels in the second group are Gb pixels located in rows of the B pixels. An in-plane variation in the image sensor 1 in terms of sensitivity exists between the Gr pixels and the Gb pixels due to a pixel arrangement or the like of the image sensor 1.

The adaptive corrector of sensitivity difference 2 corrects the sensitivity difference of the Gr pixels and the Gb pixels based on the image data supplied from the image sensor 1 and generates corrected image data.

The signal processing unit 3 performs various kinds of signal processing such as demosaic processing to the corrected image data.

The display device 4 displays an image based on the corrected image data subjected to the signal processing.

Hereinbelow, the adaptive corrector of sensitivity difference 2 will be described. The adaptive corrector of sensitivity difference 2 partitions an image P1 captured in the image sensor 1 into a plurality of macro blocks MB and performs processing.

FIG. 2 illustrates the image P1 partitioned into the plurality of macro blocks MB. In the image P1, the plurality of macro blocks MB are set in a matrix form. The number of pixels contained in each macro block MB is not limited. In the description of the present embodiment, the number of pixels is 16×16 pixels, for example. The shape of each macro block MB may be a rectangle or the like. In the image P1, a correction block CB, which is smaller than the macro block MB and which contains a plurality of pixels, is also set. The correction block CB is used for correction of the sensitivity difference and moves on the image P1 in an order of raster scanning.

Figure 3:
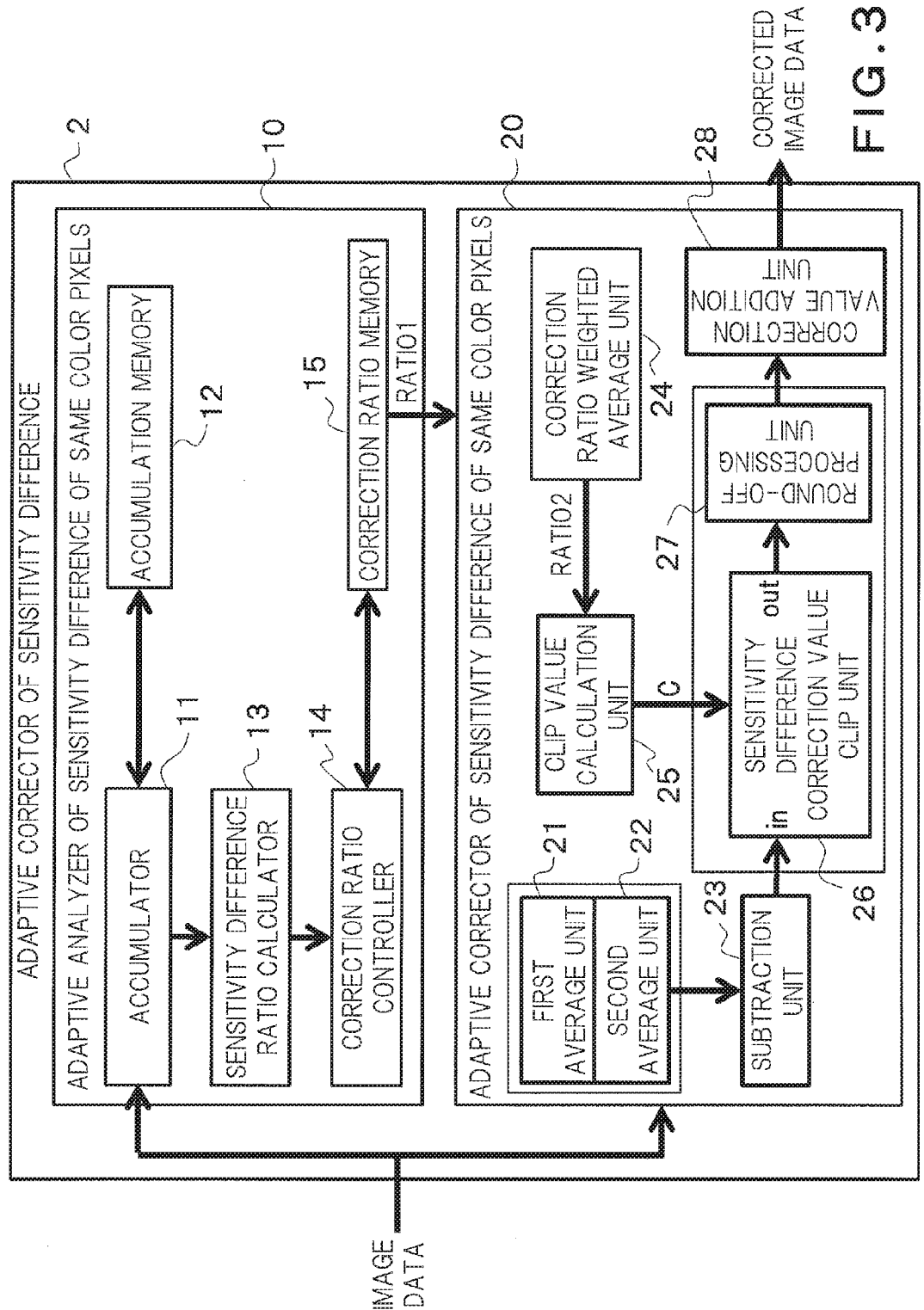
FIG. 3 is a block diagram illustrating a configuration of an adaptive corrector of sensitivity difference.

FIG. 3 is a block diagram illustrating a configuration of the adaptive corrector of sensitivity difference 2. The adaptive corrector of sensitivity difference 2 includes an adaptive analyzer of sensitivity difference of same color pixels 10 and an adaptive corrector of sensitivity difference of same color pixels 20.

The adaptive analyzer of sensitivity difference of same colorpixels 10 analyzes the sensitivity difference between the Gr pixels and the Gb pixels.

The adaptive analyzer of sensitivity difference of same colorpixels 10 includes an accumulator 11, an accumulation memory 12, a sensitivity difference ratio calculator (a calculator) 13, a correction ratio controller 14, and a correction ratio memory (a memory) 15.

The accumulator 11 cumulatively adds pixel values of the Gr pixels and the Gb pixels per macro block MB, respectively. The accumulator 11 cumulatively adds the Gr pixel values and the Gb pixel values per frame in the order of raster scanning.

The accumulation memory 12 stores cumulatively added values of the Gr pixels and the Gb pixels supplied from the accumulator 11 per macro block MB.

The sensitivity difference ratio calculator 13 calculates a ratio RATIO_CACC between the cumulatively added value of the Gr pixels and the cumulatively added value of the Gb pixels in a certain macro block MB in which the cumulative addition has been finished each time of finish of the cumulative addition of the pixel values of the Gr pixels and the Gb pixels in each macro block MB.

The correction ratio controller 14 sets a first correction ratio RATIO 1 to be used for correction of the sensitivity difference based on the ratio RATIO_CACC per macro block MB in which the cumulative addition has been finished. The first correction ratio RATIO 1 is set by using any of four setting methods described below, for example.

The correction ratio memory 15 stores the first correction ratio RATIO 1 per macro block MB. The first correction ratio RATIO 1 is updated per frame. The correction ratio memory 15 stores as many first correction ratios RATIO 1 as the number of macro blocks MB in the image P1.

Accordingly, the first correction ratio RATIO 1 can be changed dynamically per macro block MB and per frame of the image P1.

The adaptive corrector of sensitivity difference of same color pixels 20 corrects a pixel value of a correction target pixel which is either the Gr pixel or the Gb pixel by a ratio lower than or equal to a second correction ratio RATIO 2, which is based on the first correction ratio RATIO 1 of a macro block MB containing this correction target pixel.

The adaptive corrector of sensitivity difference of same color pixels 20 includes a first average unit 21, a second average unit 22, a subtraction unit 23, a correction ratio weighted average unit (a weighted average unit) 24, a clip value calculation unit 25, a sensitivity difference correction value clip unit (a correction value clip unit) 26, a round-off processing unit 27, and a correction value addition unit 28.

Figure 4:
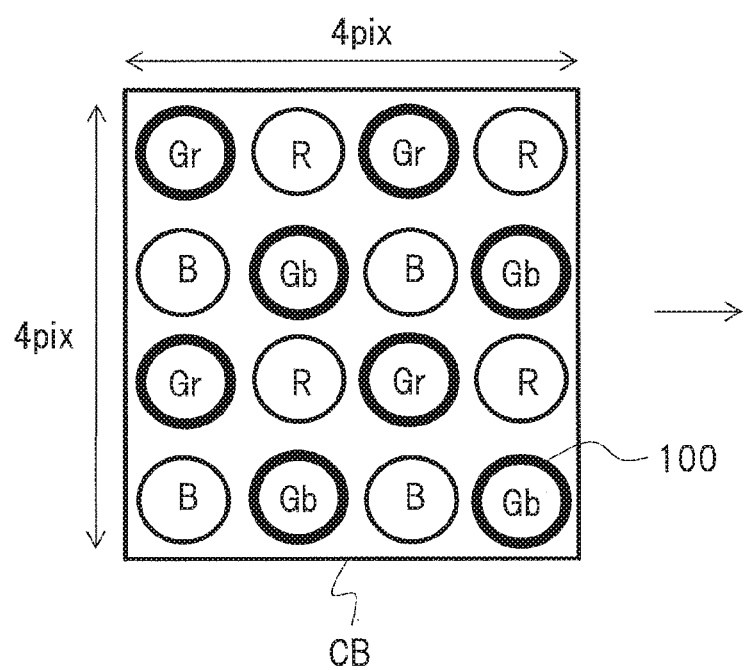
FIG. 4 is a diagram illustrating a correction block.

FIG. 4 illustrates the correction block CB. The number of pixels contained in the correction block CB is not limited. In the present embodiment, the number of pixels is 4×4 pixels, for example. The shape of the correction block CB may be a rectangle or the like. Here, a correction target pixel 100 is a pixel located at a lower right corner of the correction block CB, for example. In the correction block CB in FIG. 4, the correction target pixel 100 is the Gb pixel.

The first average unit 21 calculates a first average value of the pixel value of the correction target pixel 100 and the pixel values of the pixels belonging to the same group as that of the correction target pixel 100 in the correction block CB containing the correction target pixel 100.

The second average unit 22 calculates a second average value of the pixel values of the pixels belonging to the different group from that of the correction target pixel 100 in the correction block CB.

In a case of FIG. 4, the first average value is an average value among the four Gb pixels in the correction block CB, and the second average value is an average value among the four Gr pixels in the correction block CB.

The subtraction unit 23 subtracts the first average value from the second average value and outputs a subtraction result as a correction value.

In a case in which the correction block CB overlaps with two or more macro blocks MB, the correction ratio weighted average unit 24 sets a weighted average of the first correction ratios (RATIO 1) of the two or more macro blocks MB as the second correction ratio (RATIO 2).

In a case in which the correction block CB overlaps with only one macro block MB, the correction ratio weighted average unit 24 sets the first correction ratio (RATIO 1) of the macro block MB as the second correction ratio (RATIO 2).

The first correction ratio (RATIO 1) and the second correction ratio (RATIO 2) can be represented by using an integer such as 0 to 15.

FIG. 5A illustrates relationship between the correction ratio (RATIO) and a correction ratio [%]. In this example, "correction ratio RATIO=0" represents "correction ratio 0/256=0%," "correction ratio (RATIO)=1" represents "correction ratio 1/256=0.39%" and "correction ratio (RATIO)=15" represents "correction ratio 15/256=5.86%."

The clip value calculation unit 25 multiplies the pixel value of the correction target pixel by the second correction ratio (RATIO 2) and outputs a multiplication result (a clip value) C. In a case in which the second correction ratio (RATIO 2) is represented by using an integer out of 0 to 15, the multiplication result C is "pixel value of correction target pixel 100×RATIO 2>>8=pixel value of correction target pixel 100×RATIO 2/256." ">>8" means shifting to the left by 8 bits. The multiplication result C may be "(pixel value into which black level is subtracted from pixel value of correction target pixel 100)×RATIO 2>>8."

FIG. 5B illustrates relationship between an input correction value "in" and an output correction value "out" in the sensitivity difference correction value clip unit 26.

The sensitivity difference correction value clip unit 26 clips the correction value "out" to an upper limit value C in a case in which the correction value "in" is larger than the multiplication result C and clips the correction value "out" to a lower limit value (−C) in a case in which the correction value "in" is smaller than the negative multiplication result C. Thus, an absolute value of the correction value "out" is clipped to the multiplication result C or less. In a case of "−C≤correction value "in"≤C," the sensitivity difference correction value clip unit 26 outputs the correction value "in" as the correction value "out".

The round-off processing unit 27 rounds the correction value output from the sensitivity difference correction value clip unit 26. The processing of the round-off processing unit 27 can be omitted depending on the configuration.

The correction value addition unit 28 adds the correction value to the pixel value of the correction target pixel 100 and sets an addition result as a corrected pixel value of the correction target pixel 100. The correction value addition unit 28 outputs corrected image data composed of the corrected pixel value.

The first and second average units 21 and 22 calculate the first and second average values while moving the correction block CB and the correction target pixel 100 on the image P1 in the order of raster scanning. For example, the first and second average units 21 and 22 move the correction block CB to a position of the subsequent Gb pixel (not illustrated) set as the correction target pixel 100 (the lower right corner in the example in FIG. 4) and calculate the first and second average values. By repeating such processing, the corrector of sensitivity difference between same color pixels 20 can correct the pixel values of all of the Gr pixels and the Gb pixels on the image P1 per frame.

In parallel with the processing of the average units, the accumulator 11 cumulatively adds the pixel values of the Gr pixels and the Gb pixels in the order of raster scanning while moving the correction block CB and the correction target pixel 100.

FIG. 5C describes correction of the pixel values of the Gr pixels and the Gb pixels. By the aforementioned correction processing, the pixel values of the Gr pixels and the Gb pixels approximate each other; and the sensitivity difference is corrected.

In this manner, since the correction value is clipped to the upper limit value C and the lower limit value (−C) in the present embodiment, overcorrection of the pixel values can be prevented. This can prevent the image P1 from being changed excessively before and after correction. In a case in which the correction value is not clipped, information such as fine patterns is lost since the respective pixel values are smoothed when the resolution is high. This can be restricted by clipping the correction value. Consequently, degradation of image quality caused by correction can be restricted.

Also, since the first correction ratio (RATIO 1) is set per macro block MB, the second correction ratio (RATIO 2) considering the in-plane variation in the image sensor in terms of sensitivity can be obtained. Since the upper limit value C and the lower limit value (−C) are set based on the second correction ratio (RATIO 2), the sensitivity difference can be corrected appropriately per macro block MB.

For example, in a case in which the sensitivity difference in a certain macro block MB is relatively large, and in which the first correction ratio (RATIO 1) is relatively large, the pixel values can be corrected relatively much in this macro block MB.

On the other hand, in a case in which the sensitivity difference in a certain macro block MB is relatively small, and in which the first correction ratio RATIO 1 is relatively small, the pixel values can be corrected relatively little in this macro block MB, and overcorrection can be prevented.

Figures 6A, 6B:
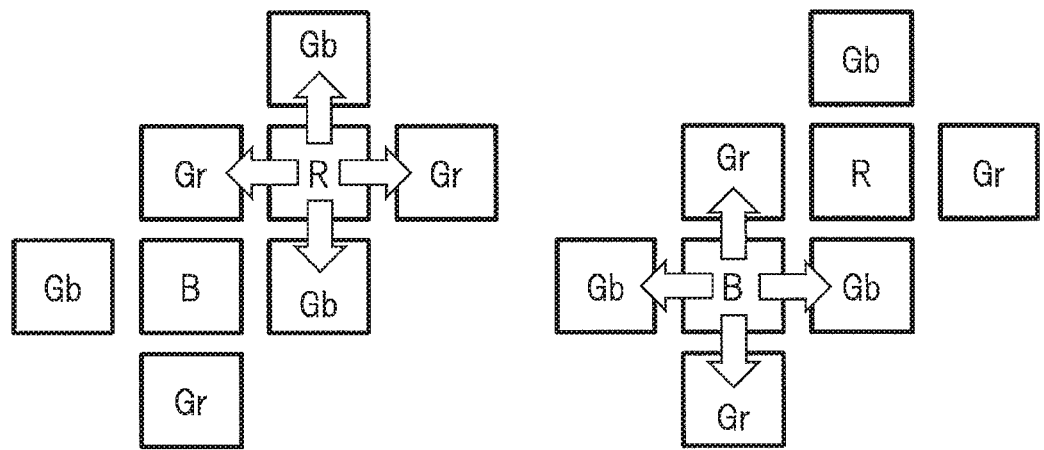
FIG. 6A is a diagram describing the leakage of a red incident light from an R pixel to the Gr pixels and the Gb pixels.
FIG. 6B is a diagram describing the leakage of a blue incident light from a B pixel to the Gr pixels and the Gb pixels.

Meanwhile, the in-plane variation in the image sensor 1 in terms of sensitivity between the Gr pixels and the Gb pixels changes with a color of incident light (a light source). For example, in a case in which red light is emitted over the entire plane of the image sensor, the red incident light does not directly enter the Gr pixels and the Gb pixels due to the presence of a color filter. However, as illustrated in FIG. 6A, the red incident light leaks from the R pixel to the Gr pixels and the Gb pixels. Thus, the pixel values of the Gr pixels and the Gb pixels increase. Accordingly, in the image sensor plane, the pixel values of the Gb pixels tend to be larger than the pixel values of the Gr pixels at the upper end and the lower end, and the pixel values of the Gr pixels tend to be larger than the pixel values of the Gb pixels at the right end and the left end.

Similarly, in a case in which blue light is emitted over the entire plane of the image sensor, the blue incident light does not directly enter the Gr pixels and the Gb pixels. However, as illustrated in FIG. 6B, the blue incident light leaks from the B pixel to the Gr pixels and the Gb pixels. Thus, the pixel values of the Gr pixels and the Gb pixels increase. Accordingly, in the image sensor plane, the pixel values of the Gr pixels tend to be larger than the pixel values of the Gb pixels at the upper end and the lower end, and the pixel values of the Gb pixels tend to be larger than the pixel values of the Gr pixels at the right end and the left end.

Accordingly, when the incident light changes over time, the in-plane variation in the image sensor in terms of sensitivity changes. Even in such a case, in the present embodiment, the first correction ratio (RATIO 1) in accordance with the change in the in-plane variation in the image sensor in terms of sensitivity over time can be obtained per frame. Accordingly, the sensitivity difference can be corrected appropriately per frame.

Next, the setting methods of the first correction ratio (RATIO 1) will be described. The Gr/Gb sensitivity difference correction ratio controller 14 sets the first correction ratio RATIO 1 by using any of the following four modes.

(Direct Mode)

In a direct mode, the correction ratio controller 14 sets the ratio RATIO_CACC as the first correction ratio (RATIO 1) per macro block MB.

Figure 7:
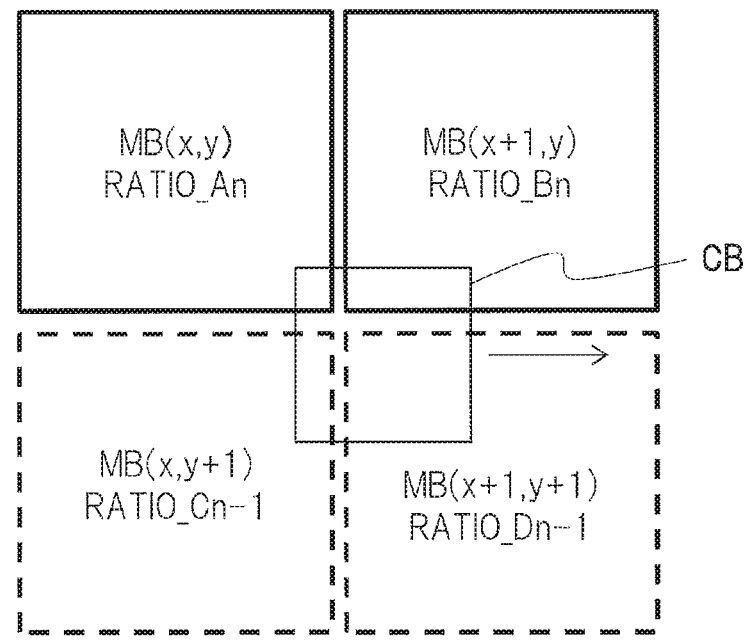
FIG. 7 is a diagram describing a direct mode of a correction ratio controller (14).

FIG. 7 describes the direct mode. A first correction ratio RATIO_An for a current frame (n frame) is set in a macro block MB (x, y), and a first correction ratio RATIO_Bn for the current frame is set in a macro block MB (x+1, y). A first correction ratio RATIO_Cn−1 for a previous frame (n−1 frame) is set in a macro block MB (x, y+1), and a first correction ratio RATIO_Dn−1 for the previous frame is set in a macro block MB (x+1, y+1). In FIG. 7 and the like, the macro block MB in which the first correction ratio RATIO 1 for the current frame is set is shown with a solid line. Also, the macro block MB in which the first correction ratio RATIO 1 for the previous frame is set is shown with a dashed line.

The correction block CB in FIG. 7 is located at a position overlapping with the four macro blocks MB (x, y), MB (x+1,y), MB (x, y+1), and MB (x+1, y+1). Thereafter, when the correction block CB moves, and the cumulative addition in the macro block MB (x, y+1) is finished, the ratio RATIO_CACC obtained is set as the first correction ratio RATIO_Cn of the macro block MB (x, y+1). Such processing is repeated, and the first correction ratio (RATIO 1) of each macro block MB is updated. In this mode, the current frame state can be reflected on the first correction ratio (RATIO 1) immediately.

(Peripheral Macro Block Reference Mode)

In a peripheral macro block reference mode, the correction ratio controller 14 sets an average of the ratio RATIO_CACC and the first correction ratios RATIO 1 for the current frame of the peripheral macro blocks MB as the first correction ratio (RATIO 1) per macro block MB.

Figure 8:
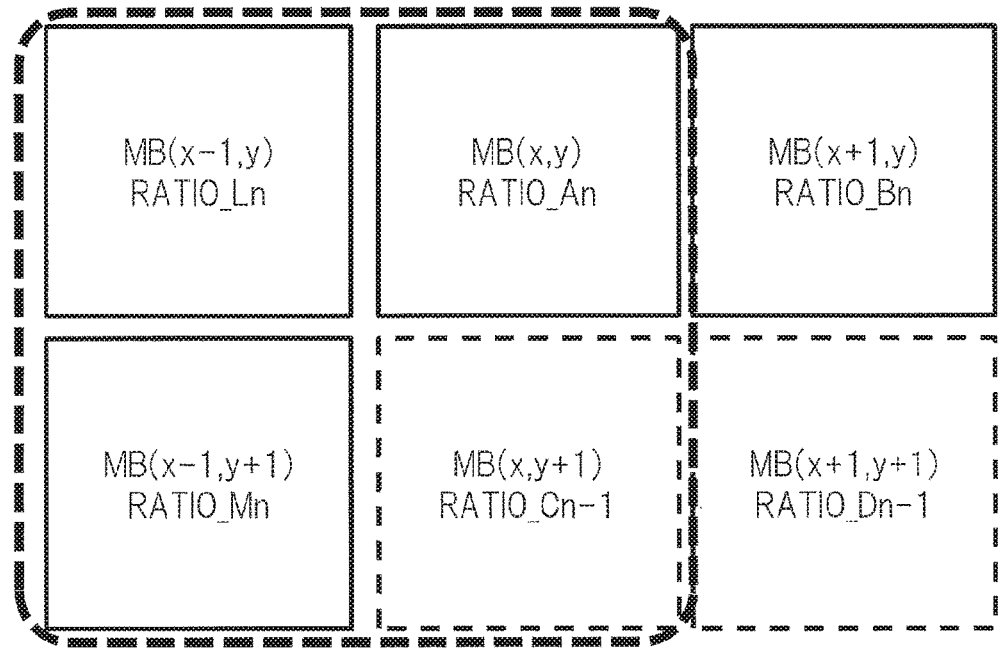
FIG. 8 is a diagram describing a peripheral macro block reference mode of a correction ratio controller (14).

FIG. 8 describes the peripheral macro block reference mode. Differences from FIG. 7 will be described mainly. A first correction ratio RATIO_Ln is set in a macro block MB (x−1, y), and a first correction ratio RATIO_Mn is set in a macro block MB (x−1, y+1).

Thereafter, when the cumulative addition in the macro block MB (x, y+1) is finished, an average of the ratio RATIO_CACC obtained and the first correction ratios RATIO_Ln, RATIO_An, and RATIO_Mn of the three peripheral macro blocks MB (x−1, y), MB (x, y), and MB (x−1, y+1) around the macro block MB (x, y+1) is set as the first correction ratio RATIO_Cn of the macro block MB (x, y+1). Such processing is repeated, and the first correction ratio RATIO 1 of each macro block MB is updated.

In this mode, the first correction ratio (RATIO 1) of the macro block MB can be set to a value that does not significantly deviate from each of the first correction ratios (RATIO 1) for the current frame of the peripheral macro blocks MB. Also, the current frame state can be reflected on the first correction ratio (RATIO 1) immediately.

(Previous Macro Block Reference Mode)

In a previous macro block reference mode, the Gr/Gb sensitivity difference correction ratio controller 14 sets an average of the ratio RATIO_CACC and the first correction ratios (RATIO 1) for the previous frame of the peripheral macro blocks MB as the first correction ratio (RATIO 1) per macro block MB in which the cumulative addition has been finished.

Figure 9:
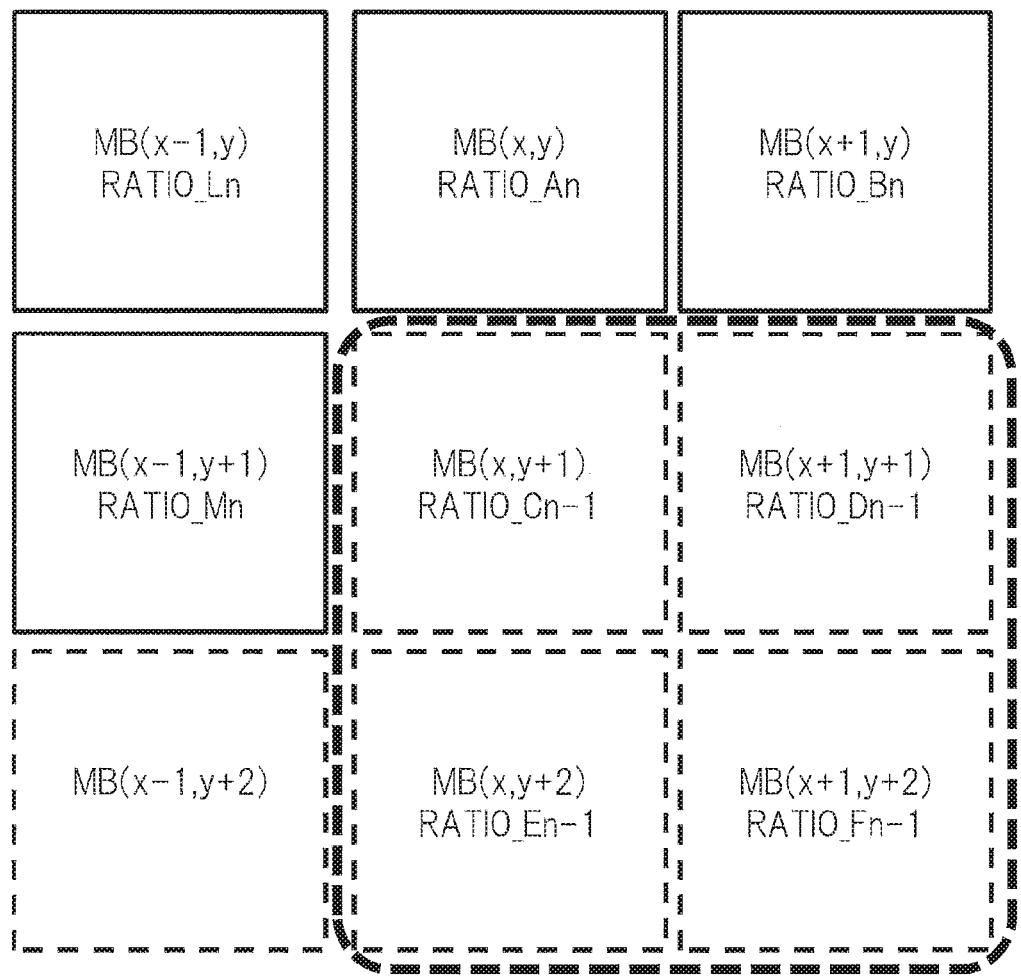
FIG. 9 is a diagram describing a previous macro block reference mode.

FIG. 9 describes the previous macro block reference mode. Differences from FIG. 7 will be described mainly. A first correction ratio RATIO_En−1 is set in a macro block MB (x, y+2), and a first correction ratio RATIO_Fn−1 is set in a macro block MB (x+1, y+2).

Thereafter, when the cumulative addition in the macro block MB (x, y+1) is finished, an average of the ratio RATIO_CACC obtained and the first correction ratios RATIO_Dn−1, RATIO_En−1, and RATIO_Fn−1 of the peripheral macro blocks MB (x+1, y+1), MB (x, y+2), and MB (x+1 y+2) is set as the first correction ratio RATIO_Cn of the macro block MB (x, y+1). Such processing is repeated, and the first correction ratio (RATIO 1) of each macro block MB is updated.

In this mode, since the set first correction ratio (RATIO 1) is influenced by the first correction ratio (RATIO 1) for the previous frame, the first correction ratio (RATIO 1) for the current frame can be prevented from changing drastically. Accordingly, drastic changes of the image in the moving image frame by frame can be restricted.

(Light Source Area Internal Reference Mode)

In a light source area internal reference mode, the image P1 is partitioned into a plurality of light source areas A to D in accordance with influences of the light source. The pixel values of the plurality of pixels in each of the light source areas A to D tend to be influenced by the light source in a similar manner. Each of the macro blocks MB is contained in any of the plurality of light source areas A to D.

Figure 10A:
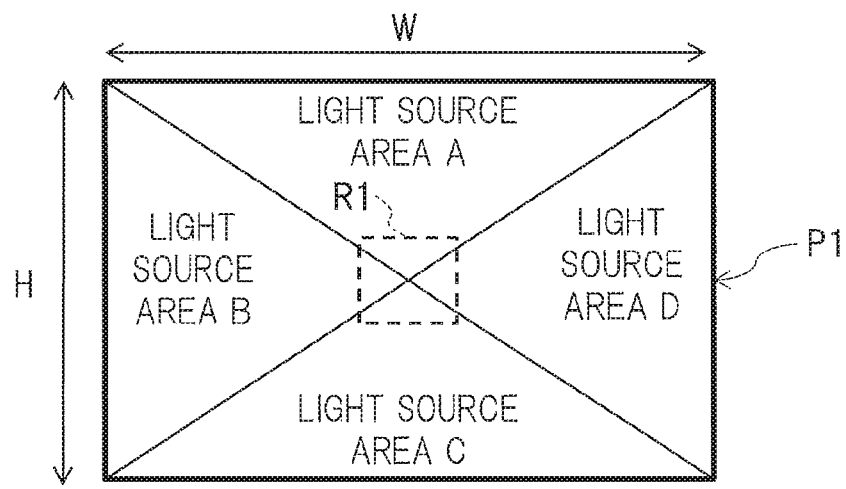
FIG. 10A is a diagram illustrating light source areas A to D.

FIG. 10A illustrates the light source areas A to D. The light source areas A to D are four approximately triangular areas, having a vertex around the center of P1, provided by partitioning the image P1 by two diagonal lines. The light source area A is an area having a base along the upper side of the image P1, and the light source area C is an area having a base along the lower side of the image P1. The light source area B is an area having a base along the left side of the image P1, and the light source area D is an area having a base along the right side of the image P1.

For example, in a case in which red light is emitted over the entire plane of the image sensor, the pixel values of the Gb pixels tend to be larger than the pixel values of the Gr pixels in the light source areas A and C, and the pixel values of the Gr pixels tend to be larger than the pixel values of the Gb pixels in the light source areas B and D.

Figure 10B:
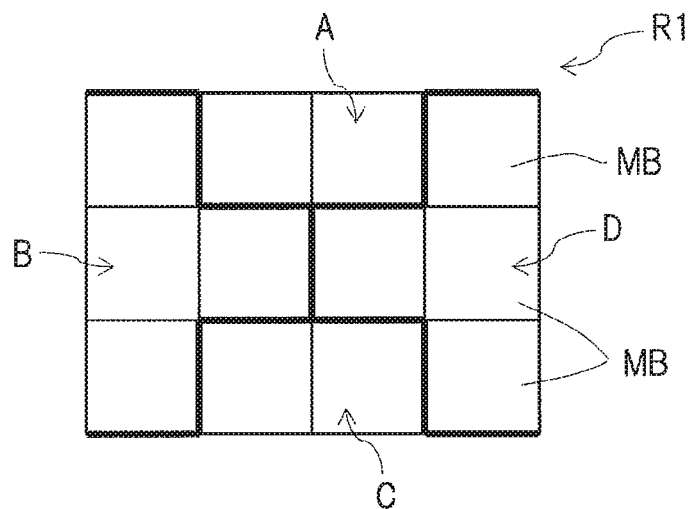
FIG. 10B is an enlarged view of an area R1 around a center of FIG. 10A.

FIG. 10B is an enlarged view of an area R1 around the center of FIG. 10A. The border of the light source areas A to D is located at the border of the macro blocks MB.

The correction ratio controller 14 sets an average of the ratio RATIO_CACC and the first correction ratios (RATIO 1) of the peripheral macro blocks MB of the macro block MB in which the cumulative addition has been finished in the light source area as the first correction ratio RATIO 1, per macro block MB.

FIGS. 11A to 11D describe the light source area internal reference mode. In FIGS. 11A to 11D, the macro block MB in which the cumulative addition has been finished is contained in the light source area D. For example, in FIG. 11A, for the macro block MB (x−1, y+1), in which the cumulative addition has been finished, an average is calculated by using the first correction ratio RATIO 1 for the current frame of the peripheral macro block MB (x, y) and the first correction ratios (RATIO 1) for the previous frame of the peripheral macro blocks MB (x, y+1) and MB (x, y+2).

Figure 11A:
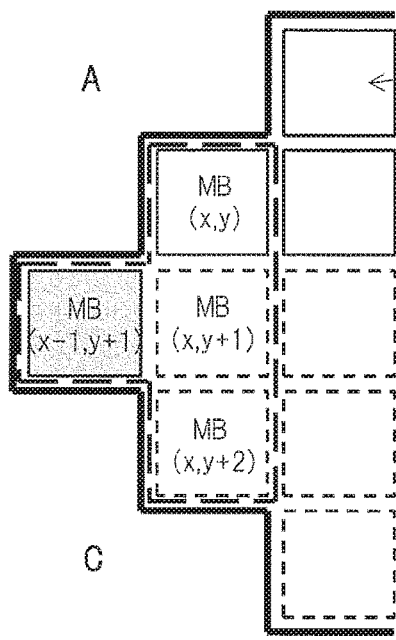
FIGS. 11A to 11D are diagrams describing a light source area internal reference mode of a correction ratio controller (14).
Figure 11B:
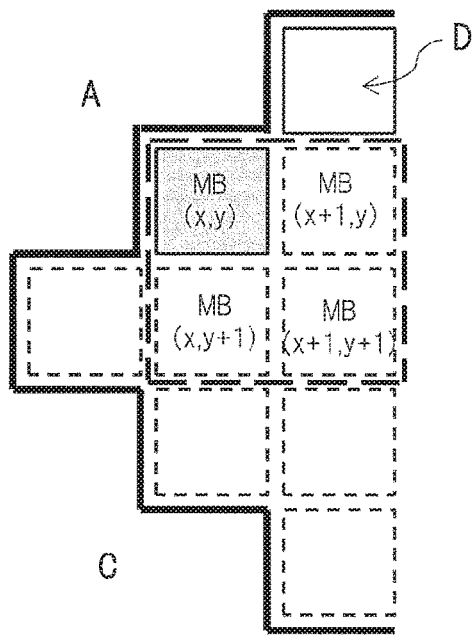

In FIG. 11B, for the macro block MB (x, y), in which the cumulative addition has been finished, an average is calculated by using the first correction ratios (RATIO 1) for the previous frame of the peripheral macro blocks MB (x+1, y), MB (x, y+1), and MB (x+1, y+1).

Figure 11C:
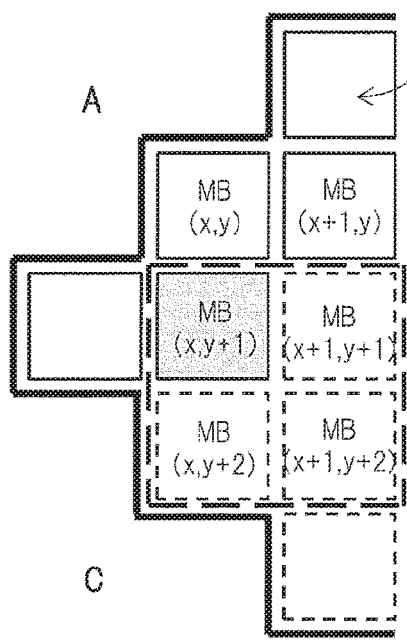

In FIG. 11C, for the macro block MB (x, y+1), in which the cumulative addition has been finished, an average is calculated by using the first correction ratios (RATIO 1) for the previous frame of the peripheral macro blocks MB (x+1, y+1), MB (x, y+2), and MB (x+1, y+2).

Figure 11D:
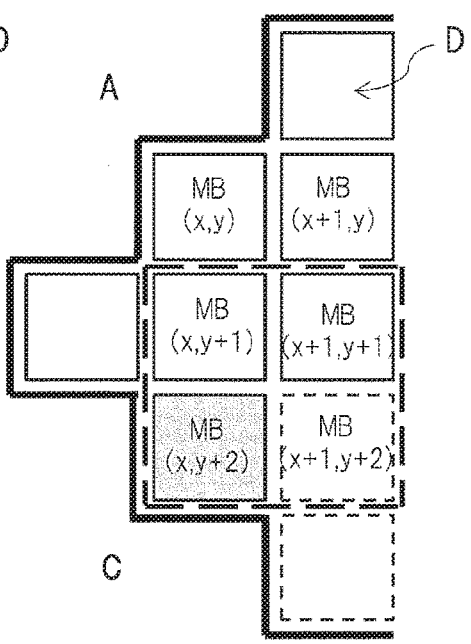

In FIG. 11D, for the macro block MB (x, y+2), in which the cumulative addition has been finished, an average is calculated by using the first correction ratios RATIO 1 for the current frame of the peripheral macro blocks MB (x, y+1) and MB (x+1, y+1) and the first correction ratio (RATIO 1) for the previous frame of the peripheral macro block MB (x+1, y+2).

In this mode, since the first correction ratio (RATIO 1) of the macro block MB in the different light source area having a different influence of the light source is not used, the more appropriate first correction ratio (RATIO 1) can be obtained under an environment in which the light source is biased.

It is to be noted that the peripheral macro blocks MB for use in calculation are not limited to the examples in FIGS. 11A to 11D. Also, the number and arrangement of the light source areas are not limited to the aforementioned examples and can be changed depending on arrangement of the pixels and the like.

In the peripheral macro block reference mode, the previous macro block reference mode, and the light source area internal reference mode, the peripheral macro blocks MB for use in calculation of the average preferably include the macro block MB adjacent to the macro block MB in which the cumulative addition has been finished. Also, the number of the peripheral macro blocks MB for use in calculation of the average is not limited to three.

Next, the correction ratio weighted average unit 24 will be described.

Figure 12:
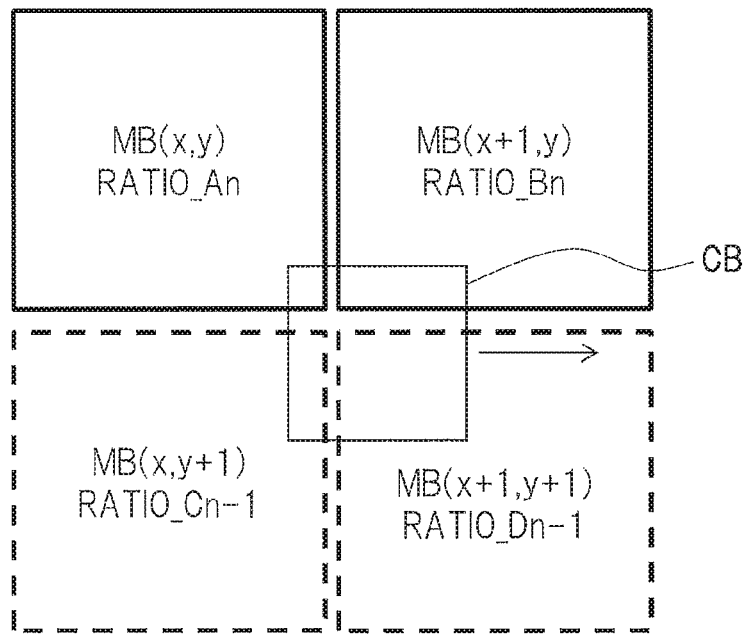
FIG. 12 is a diagram describing a weighted average of a correction ratio weighted average unit (24).

FIG. 12 describes the weighted average. The correction ratio weighted average unit 24 derives the number of pixels overlapping with the correction block CB per macro block MB. In a case of FIG. 12, among the plurality of pixels in the correction block CB, a first pixel number in the first macro block MB (x, y), a second pixel number in the second macro block MB (x+1, y), a third pixel number in the third macro block MB (x, y+1), and a fourth pixel number in the fourth macro block MB (x+1, y+1) are derived.

The correction ratio weighted average unit 24 divides the total sum of respective products of the first correction ratios (RATIO 1) and the pixel numbers of the macro blocks MB overlapping with the correction block CB by the number of pixels in the correction block CB. In the case of FIG. 12, the sum, of the product of the first correction ratio RATIO_An of the first macro block MB (x, y) and the first pixel number, the product of the first correction ratio RATIO_Bn of the second macro block MB (x+1, y) and the second pixel number, the product of the first correction ratio RATIO_Cn−1 of the third macro block MB (x, y+1) and the third pixel number, and the product of the first correction ratio RATIO_Dn−1 of the fourth macro block MB (x+1, y+1) and the fourth pixel number, is divided by the number of pixels in the correction block CB. The correction ratio weighted average unit 24 sets this division result as the second correction ratio (RATIO 2).

Here, the correction ratio weighted average unit 24 uses the first correction ratios for the previous frame (n−1 frame) of the third and fourth macro blocks MB (x, y+1) and MB (x+1, y+1).

In this manner, in the case in which the correction block CB overlaps with two or more macro blocks MB, the second correction ratio (RATIO 2) is derived in consideration of the respective first correction ratios (RATIO 1) of the two or more macro blocks MB overlapping with the correction block CB. Thus, even when the correction block CB moves from a certain macro block MB to a position at which the correction block CB overlaps with two or more macro blocks MB having a large difference of the first correction ratios (RATIO 1) (a border of the macro blocks MB), the second correction ratio (RATIO 2) can be prevented from changing drastically.

Conversely, in a case in which such weight average calculation is not performed, which causes the second correction ratio (RATIO 2) to change drastically at the border of the macro blocks MB, the upper limit value C and the lower limit value (−C) also change drastically. Consequently, the correction value may also change drastically at the border of the macro blocks MB, and the border of the macro blocks MB may be visually recognized on the corrected image. Accordingly, by performing the weight average calculation, it is possible to prevent the border of the macro blocks MB from being visually recognized due to correction of the pixel values.

As described above, according to the present embodiment, sensitivity difference between the same color pixels can be corrected appropriately in consideration of arrangement of the pixels of the image sensor 1 and incident light which changes over time.

It is to be noted that, although an example in which the same color pixels are the G pixels has been described, the present invention is not limited to this. The same color pixels may be other pixels as long as they are same color pixels divided into first and second groups in accordance with relative positions to different color pixels. Also, the plurality of pixels may be arranged in an arrangement other than the Bayer array.

At least a portion of the adaptive corrector of sensitivity difference 2 described in the above embodiments may be constituted by hardware or software. In the software configuration, a program realizing at least a portion of the functions of the adaptive corrector of sensitivity difference 2 is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the adaptive corrector of sensitivity difference 2 may be distributed through a communication line (including wireless communication) such as the Internet. While the program is encrypted, modulated, or compressed, the program may be distributed through a wired line or a wireless line such as the Internet, or the program stored in a recording medium may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An adaptive corrector of sensitivity difference of color pixels analyzing a sensitivity difference among the color pixels of an image sensor, the same color pixels being divided into a first group and a second groups in accordance with relative positions to different color pixels, the adaptive corrector of sensitivity difference of the same color pixels comprising:
    an accumulator configured to cumulatively add pixel values of pixels in the first group and pixel values of pixels in the second group per macro block, respectively, on an image captured in the image sensor;
    a calculator configured to calculate a ratio between a cumulatively added value of the pixels in the first group and a cumulatively added value of the pixels in the second group in the macro block;
    a correction ratio controller configured to set a correction ratio for the sensitivity difference based on the ratio per macro block; and
    a memory configured to store the correction ratio per macro block,
    wherein the adaptive corrector of sensitivity difference is further configured to correct a
value of a target pixel in either the first group or the second group based on the correction ratio.

2. The adaptive corrector of sensitivity difference of the same color pixels according to claim 1, wherein the correction ratio controller sets, as the correction ratio corresponding to each macro block, the ratio calculated by the calculator for each macro block.

3. The adaptive corrector of sensitivity difference of the same color pixels according to claim 1, wherein the accumulator cumulatively adds the pixel values of the pixels in the first group and second group per frame,
    the memory updates the stored correction ratio per frame, and
    the correction ratio controller sets an average of the ratio calculated by the calculator and the correction ratio for a current frame of a peripheral macro block as the correction ratio, per macro block.

4. The adaptive corrector of sensitivity difference of the same color pixels according to claim 1, wherein the accumulator cumulatively adds the pixel values of the pixels in the first group and second group per frame, the memory updates the stored correction ratio per frame, and the correction ratio controller sets an average of the ratio calculated by the calculator and the correction ratio for a previous frame of a peripheral macro block as the correction ratio, per macro block.

5. The adaptive corrector of sensitivity difference of the same color pixels according to claim 1, wherein the image is partitioned into a plurality of light source areas, and the correction ratio controller sets an average of the ratio calculated by the calculator per macro block and the correction ratio of peripheral macro blocks in the same light source area from the plurality of partitioned light source areas.

6. The adaptive corrector of sensitivity difference between the same color pixels according to claim 1, wherein a plurality of pixels in the image sensor are arranged in a Bayer array, and the pixels in the first group are Gr pixels, and the pixels in the second group are Gb pixels.

7. An adaptive corrector of sensitivity difference of color pixels correcting a sensitivity difference between the color pixels of an image sensor, the same color pixels being divided into a first group and a second groups in accordance with relative positions to different color pixels, the adaptive corrector of sensitivity difference between the same color pixels comprising:

an accumulator configured to cumulatively add pixel values of pixels in the first group and pixel values of pixels in the second group per macro block, respectively, on an image captured in the image sensor;

a calculator configured to calculate a ratio between a cumulatively added value of the pixels in the first group and a cumulatively added value of the pixels in the second group in the macro block;

a correction ratio controller configured to set a first correction ratio for the sensitivity difference based on the ratio per macro block;

a memory configured to store the first correction ratio per macro block; and a corrector of sensitivity difference of the same color pixels configured to correct a pixel value of a correction target pixel which is either the pixel in the first group or the pixel in the second group by a ratio lower than or equal to a second correction ratio, the second correction ratio being based on the first correction ratio of the macro blocks overlapped by the predetermined block containing the correction target pixel.

8. The adaptive corrector of sensitivity difference of the same color pixels according to claim 7, wherein the processing circuitry is further configured to:

calculate a first average value of the pixel value of the correction target pixel and the pixel value of the pixel belonging to the same group as that of the correction target pixel in a correction block containing the correction target pixel, the correction block being smaller than the macro block;

calculate a second average value of the pixel value of the pixel belonging to the different group from that of the correction target pixel in the correction block;

output a result of subtracting the first average value from the second average value as a correction value;

output a multiplication result of multiplying the pixel value of the correction target pixel by the second correction ratio, the second correction ratio being based on the first correction ratio of the macro blocks overlapped by the predetermined block containing the correction target pixel;

clip the correction value to an upper limit value equal to the multiplication result when the correction value is larger than the upper limit value, and configured to clip the correction value to a lower limit value equal to the multiplication value which is negative when the correction value is smaller than the lower limit value; and output a result of adding the correction value to the pixel value of the correction target pixel as a corrected pixel value of the correction target pixel.

9. The adaptive corrector of sensitivity difference of the same color pixels according to claim 8, wherein first and second average values are calculated while moving the correction block on the image in an order of raster scanning.

10. The adaptive corrector of sensitivity difference of the same color pixels according to claim 9, wherein the accumulator cumulatively adds the pixel values of the pixels in the first group and second group per frame, and the memory updates the stored correction ratio per frame.

11. The adaptive corrector of sensitivity difference of the same color pixels according to claim 8, wherein the processing circuitry is configured to:

set a weighted average of the first correction ratios of two or more of the macro blocks overlapping with the correction block as the second correction ratio.

12. The adaptive corrector of sensitivity difference of the same color pixels according to claim 11, wherein in first to fourth macro blocks comprising the macro blocks overlapping with the correction block, a first pixel number of the pixels in the first macro block, a second pixel number of the pixels in the second macro block, a third pixel number of the pixels in the third macro block, and a fourth pixel number of the pixels in the fourth macro block in the correction block are derived, and as the second correction ratio, a result of dividing a sum of a product of the first correction ratio of the first macro block and the first pixel number, a product of the first correction ratio of the second macro block and the second pixel number, a product of the first correction ratio of the third macro block and the third pixel number, and a product of the first correction ratio of the fourth macro block and the fourth pixel number, by a pixel number in the correction block is set.

13. The adaptive corrector of sensitivity difference of the same color pixels according to claim 12, wherein the accumulator cumulatively adds the pixel values of the pixels in the first group and second group per frame, the memory updates the stored correction ratio per frame, and the second correction ratio is set by using the first correction ratio for a previous frame of the macro block in which the first correction ratio for a current frame is not set among the first to fourth macro blocks.

14. The adaptive corrector of sensitivity difference of the same color pixels according to claim 7, wherein the correction ratio controller sets the ratio as the first correction ratio per macro block.

15. The adaptive corrector of sensitivity difference of the same color pixels according to claim 7, wherein the accumulator cumulatively adds the pixel values of the pixels in the first group and second group per frame, the memory updates the stored correction ratio per frame, and the correction ratio controller sets an average of the ratio and the first correction ratio for a current frame of a peripheral macro block as the first correction ratio, per macro block.

16. The adaptive corrector of sensitivity difference of the same color pixels according to claim 7, wherein the accumulator cumulatively adds the pixel values of the pixels in the first group and second group per frame,
the memory updates the stored correction ratio per frame, and
the correction ratio controller sets an average of the ratio and the first correction ratio for a previous frame of a peripheral macro block as the first correction ratio, per macro block.

17. The adaptive corrector of sensitivity difference of the same color pixels according to claim 7, wherein the image is partitioned into a plurality of light source areas, and
the correction ratio controller sets an average of the ratio calculated by the calculator per macro block and the first correction ratio of a peripheral macro blocks in the same light source area from the plurality of the partitioned light source areas.

18. The adaptive corrector of sensitivity difference of the same color pixels according to claim 7, wherein a plurality of pixels in the image sensor are arranged in a Bayer array, and
the pixels in the first group are Gr pixels or Gb pixels, and the pixels in the second group are Gb pixels or Gr pixels.

19. The adaptive corrector of sensitivity difference of the same color pixels according to claim 17, wherein a plurality of pixels in the image sensor are arranged in a Bayer array, and
the plurality of light source areas are four areas partitioned by two diagonal lines of the image.

20. An image processing system comprising:
an image sensor configured to capture an image;
an adaptive corrector of sensitivity difference of color pixels configured to, based on image data of the image supplied from the image sensor, correct a sensitivity difference among the same color pixels of the image sensor, the same color pixels being divided into a first group and a second group in accordance with relative positions to different color pixels, and generate corrected image data; and
a display device configured to display an image based on the corrected image data,
wherein the adaptive corrector of sensitivity difference of the same color pixels comprises:
an accumulator configured to cumulatively add pixel values of pixels in the first group and pixel values of pixels in the second group per macro block, respectively, on the image;
a calculator configured to calculate a ratio between a cumulatively added value of the pixels in the first group and a cumulatively added value of the pixels in the second group in the macro block;
a correction ratio controller configured to set a first correction ratio for the sensitivity difference based on the ratio per macro block;
a memory configured to store the first correction ratio per macro block; and
a corrector of sensitivity difference of the same color pixels configured to correct a pixel value of a correction target pixel which is either the pixel in the first group or the pixel in the second group by a ratio lower than or equal to a second correction ratio, the second correction ratio being based on the first correction ratio of the macro blocks overlapped by the predetermined block containing the correction target pixel.

* * * * *